United States Patent Office 3,437,355
Patented Apr. 8, 1969

3,437,355
TELESCOPIC COUPLING
Robert Henry Francis Jeffes, Peaches Farm, Minchinhampton, Stroud, Gloucestershire, England
Filed Sept. 25, 1967, Ser. No. 670,099
Claims priority, application Great Britain, Sept. 29, 1966, 43,554/66
Int. Cl. B60d 1/04
U.S. Cl. 280—478         7 Claims

ABSTRACT OF THE DISCLOSURE

A telescopic coupling having a hook on the outer end of the inner member thereof. The hook is fitted with a retaining pin which is biased by a spring into a position in which it extends from one side wall of the hook to restrict the mouth of the latter, thereby to hold in the hook a link member placed therein. The retaining pin is retractable to release the link member by direct manual withdrawal of the retaining pin, both when the members of the coupling are retracted and when they are extended. The coupling also carries a lever engageable with the retaining pin only when the members of the coupling are retracted, thereby to provide for retraction of the retaining pin by remote operation of the lever.

---

The invention relates to a telescopic coupling having inner and outer telescopically-slidable members and is particularly, but not exclusively, concerned with an improvement to the telescopic coupling claimed and described in the specification of my co-pending patent application No. 553,835, filed May 31, 1966 and now Patent No. 3,361,446.

An object of the present invention is to provide in a telescopic coupling, self-lockable connecting means such as a hook by which an implement or a trailer can be attached to one of the members of the coupling, the other member thereof being arranged to be attached to a tractor or other vehicle. The aforesaid specification states that a self-locking hook may be employed for that purpose, but does not describe such a hook.

According to the present invention, a telescopic coupling having inner and outer telescopically-slidable members includes connecting means comprising a seating on one of said members for receiving a detachable link member to be retained in said seating, movable jaw means mounted on said seating and movable between an operative position to which it is biased and in which it cooperates with said seating to retain said link member therein and a release position in which said link member is free to move out of the seating, means whereby said jaw means is movable manually against said bias into said release position both when the members of the coupling are in their retracted positions and when they are in their extended positions and remotely-operable release means arranged to act on said jaw means to move said jaw means to its release position when the members of the coupling are in their retracted positions.

Conveniently, the seating is in the form of a hook and said jaw means is movable transversely of a side face of the hook to restrict the mouth thereof, thereby to trap said link member after the latter has been inserted into the hook through the mouth thereof. The jaw means is conveniently biased into the position in which it restricts the mouth of the hook by spring means but it may be biased by its own weight.

Figure 1:
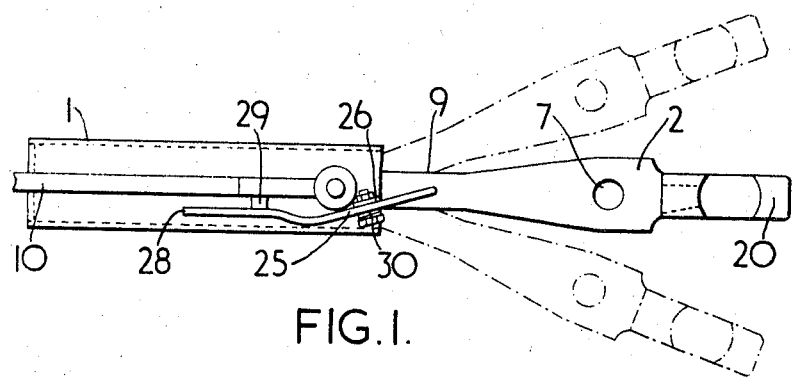
Figure 2:
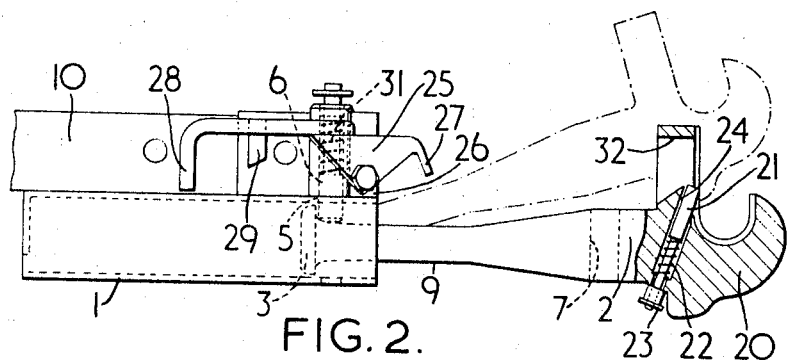
Figure 3:
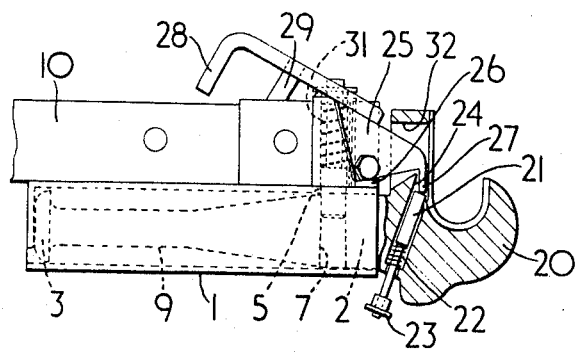
Figure 4:
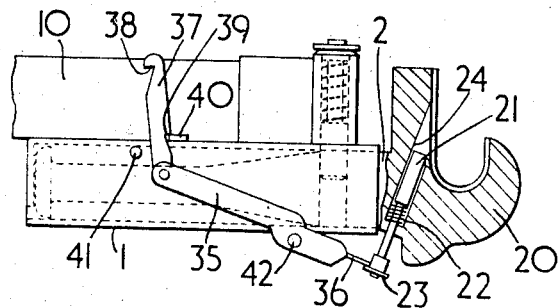
Figure 5:
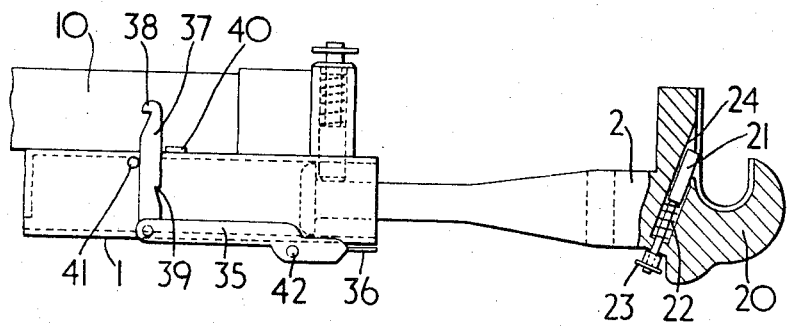

By way of example, two embodiments of telescopic couplings in accordance with the present invention will now be described with reference to the accompanying drawings, in which:

FIGURE 1 is a plan view of the first coupling when extended;
FIGURE 2 is a part-sectional side view of the first coupling when extended;
FIGURE 3 is a part-sectional side veiw of the first coupling when unextended;
FIGURE 4 is a view of the second coupling similar to FIGURE 3, and
FIGURE 5 is a view of the second coupling similar to FIGURE 2.

The telescopic couplings shown in FIGURES 1 to 3 and FIGURES 4 and 5 hereof are basically similar to that shown in the drawings accompanying the aforesaid specification and the same reference numerals have been used herein for like parts. Each of the couplings hereof comprises telescopically-slidable inner and outer members 1 and 2 of which the outer member 1 is arranged to be attached by the plate 10 to a tractor (not shown) and the inner member 2 is arranged to be attached by self-lockable connecting means to an implement (not shown). The self-lockable connecting means provided by the present invention comprises a hook 20 welded to or integral with the outer end face of the inner member 2 in place of the plate 14 shown in the drawings of the aforesaid specification. The hook 20 is arranged to receive therewithin a detachable link member, such as a pin or shackle (not shown) attached to the implement. The mouth of the hook 20 is wider than the pin or shackle and so the latter is free to move out of the mouth of the hook except for the provision of movable jaw means in the form of a retaining pin 21 carried by the hook 20 and arranged to extend through a hole 24 in the base and one side thereof and in that position to reduce the effective width of the mouth of the hook and thereby to retain the pin or shackle in the hook. The retaining pin 21 is biased by a spring 22 into its locking or operative position and is provided with a head 23 by which the pin can be withdrawn by direct manual operation, both when the telescopic members 1 and 2 of the coupling are extended or unextended, to release a pin or shackle which has been placed in the jaw. The hook is of the self-lockable kind because when the pin or shackle to be retained therein is placed in the hook that action will temporarily displace the retaining pin 21 against the bias of the spring 22 to admit the pin or shackle and, when the latter has fully entered the hook, the retaining pin 21 will be returned by the spring 22 into its locking position.

Also in accordance with the present invention, the outer member 1 of the coupling is provided with remotely-operable release means, whereby the retaining pin 21 can be withdrawn by remote operation when the telescopic members 1 and 2 of the coupling are unextended.

Referring to FIGURES 1 to 3, the remotely-operable release means comprises a lever 25 pivotally mounted on a lug 26 provided on the top of the outer member 1. The lever 25 has a finger 27 at one end thereof which is arranged to enter the end of the hole 24 adjacent the mouth of the hook 20 and to depress the retaining pin 21 against the bias of the spring 22, as shown in FIGURE 3. The opposite end of the lever 25 carries a downwardly-directed limb 28 forming a hook, which can be lifted by an operator either by gripping the limb directly or by means of a chain or another limb, thereby to move the lever from its inoperative position, as shown in FIGURES 1 and 2, to its operative position, as shown in FIGURE 3. The lever also carries a stop 29 which rests against a side face of the plate 10 when the lever 25 is in its inoperative position, as shown in FIGURES 1 and 2, and which rests on the top face of the plate 10, as shown in FIGURE 3, when the lever is in its operative position, to hold the finger 27 against the retaining pin 21. The lever 25 is permitted slight movement along its pivot relatively to the lug 26 and is biased into the position shown in FIGURE 3 by a light spring or spring washer 30. Thus when the lever 25 is moved to its operative position by lifting the limb 28, the spring 30 will move the lever bodily thereby to enable the stop 29 to engage the top of the plate 10 and to hold the finger 27 against the depressed retaining pin 21. When the lever is to be moved back to its inoperative position it is moved sideways until the stop 29 can slide down the side face of the plate 10 under the weight of the limb 28.

Except for the hook 20 and the direct and remote release means, the coupling is substantially the same as that shown in the aforesaid specification in which the inner member 2 is held in the outer member by a spring biased pin 6 engageable in holes 5 and 7 in the members 1 and 2 respectively. In the coupling illustrated in FIGURES 1 to 3 hereof the pin 6 is biased inwardly of the member 1 by a helical compression spring 31 instead of a leaf spring 8, as in the aforesaid specification. When the coupling is in its extended position, as shown in FIGURES 1 and 2, the member 2 is permitted limited universal movement, as indicated by chain lines in FIGURES 1 and 2, by virtue of the neck portion 9 and the rounded edges of the inner end portion 3 thereof. As in the aforesaid specification, the inner end portion 3 and the interior of the outer member 1 are of square cross-section, thereby preventing turning of the member 2 in the member 1. The retaining pin 21 can be withdrawn by means of the head 23 both when the members of the coupling are extended or unextended and alternatively by means of the lever 25, when the members are unextended, the latter then extending through a clearance aperture 32 provided in the adjacent side wall of the hook 20.

Turning now to the second embodiment shown in FIGURES 4 and 5, the coupling, including the hook, is the same as that shown in FIGURES 1 to 3; but the remotely operable release means is different. The latter comprises a lever 35 which is pivotally mounted at 42 on the outer member 1. One end of the lever is in the form of a finger 36 which is engageable with the head 23 of the retaining pin 21 when the coupling is unextended, and the other end of the lever is pivotally-connected to a link 37 having a hook-shaped upper end 38, which can be lifted by the operator directly or via a cable, chain or another link, to retract the retaining pin 21. The link 37 has a tooth 39 formed thereon which is engageable with an abutment 40 carried on the member 1 to hold the lever 35 in its operative position, as shown in FIGURE 4, in which the retaining pin 21 is held retracted. The link 37 is located in the inoperative position of the lever 35 by a stop pin 41 carried on the member 1, as shown in FIGURE 5. As in the first embodiment, the retaining pin 21 can be withdrawn, to allow a pin or shackle to be moved from the hook, by direct manual operation of the retaining pin 21 both when the coupling is extended or unextended. Alternatively, when the coupling is unextended, as in FIGURE 4, the retaining pin 21 can be withdrawn by lifting the link 37.

Where an implement is to be connected by a pair of telescopic couplings, each being, for example, of the kind shown in FIGURES 1 to 3 or 4 and 5, to the lower attachment positions of a three-point lift mechanism of a tractor, the implement is attached by a pin, shackle or equivalent link member to the self-lockable hook of each of the couplings, the latter being in their telescopically-extended positions. If the operator should later wish to uncouple the implement while the couplings are still extended, he can do so by manually withdrawing the retaining pin of each hook. When the implement is to be used, the tractor is backed towards the implement until each coupling has been fully retracted. In that position, the end of the retaining pin of each hook will be in such a position that the retaining pin will be withdrawn by operation of the respective lever. Each lever is conveniently connected to a common operating chain or cable, whereby on pulling the latter the driver of the tractor will withdraw both retaining pins simultaneously as he lowers the implement by means of the lift mechanism of the tractor. As the implement engages the ground, the link members attached thereto will leave their respective hooks and the implement will therefore be uncoupled from the tractor. By connecting the three attachment positions of a three-point lift mechanism together by means of adjustable links or turnbuckles, all three attachment positions could be connected to appropriate attachment positions on the implement by telescopic couplings each being of the kind shown in FIGURES 1 to 3 or 4 and 5 hereof. In that case, all three levers would be connected to a common operating chain or cable, whereby the retaining pins of all three jaws would be released simultaneously. If necessary, the top telescopic coupling could be connected to the top attachment position of the tractor by a link of adjustable length, e.g., a telescopic link or a turnbuckle.

If desired, the illustrated means for remotely withdrawing the retaining pin from the hook of a telescopic coupling can be replaced by electrical means, such as a solenoid arranged to withdraw the pin.

The hook conveniently has a part-spherical concave surface and the pin, shackle or other link member has a co-operable part-spherical convex surface or carries a ball-shaped collar thereon.

Instead of the concave surface being on a hook it could be provided on the wall of a hole into which a pin carrying a ball-shaped collar is arranged to be inserted laterally and retained therein by means of a withdrawable retaining pin, arranged similarly to the retaining pin hereinbefore described in relation to a hook, especially that illustrated in FIGURES 4 and 5.

Although the remotely-operable release means illustrated herein are levers arranged to withdraw jaw means in the form of the retaining pin 21, both the remotely-operable release means and the jaw means may take other forms. For example, the jaw means may be a block pivotally mounted in a recess in one inside wall of the hook and movable from a release position in which it is substantially flush with said inside wall to an operating position in which it extends inwardly of said inside wall to restrict the mouth of the jaw. The block may be biased into said operative position by its own weight or by a spring, such as a leaf spring, bearing directly against said block or indirectly through another pivotally-mounted block. Where the block is biased into said operative position by its own weight, it may be provided with a lug, whereby it can be lifted into the release position either by the operator gripping the lug when the coupling is extended or unextended or by remote operation through a cable, chain or hooked member engaging the lug when the coupling is unextended. Where the block is biased into said operative position by spring means, another pivotally-mounted block having a surface of profile shaped to engage a surface of the jaw block may be used to move the latter block into each of its release and operative positions and to hold said jaw block in each of said positions. The said other block may have a lug thereon for engagement by the operator for local operation when the coupling is unextended or extended or by a cable, chain or hooked member for remote operation, when the coupling is unextended.

Although the self-lockable connecting means provided by this invention has been described in relation to the telescopic coupling described and claimed in the aforesaid specification, it could be applied to any other type of telescoping coupling.

Although the telescopic coupling provided by this invention has been described in relation to the coupling of an implement to a tractor, it could be used for connecting a trailer, such as a caravan or a boat carrier, to a motor vehicle.

What I claim as my invention and desire to secure by Letters Patent of the United States is:

1. A telescopic coupling having inner and outer telescopically-slidable members and including connecting means comprising a hook-shaped seating on said inner member for receiving a detachable link member to be retained in said seating, jaw means mounted on said seating and movable, transversely of a side face of said seating to restrict the mouth thereof, between an operative position in which said jaw means co-operates with said seating to retain said link member therein after the latter has been inserted into the seating through said mouth and a release position in which said link member is free to move out of said seating, spring means biasing said jaw means into its operative position, means for manually moving said jaw means against said bias into said release position both when the members of the coupling are in their retracted positions and when they are in their extended positions wherein the improvement comprises a remotely-operable lever pivotally mounted on said outer member and movable to engage said jaw means to hold the latter in its release position when the coupling members are in their retracted positions.

2. A coupling as claimed in claim 1 in which a fixed abutment is provided to hold said lever in the position in which it holds said jaw means in its release position.

3. A coupling as claimed in claim 1 in which said jaw means is a retaining pin biased into its operative position by said spring means and having a head portion to be gripped by an operator.

4. A coupling as claimed in claim 3 in which said lever has a finger portion engageable with said head portion of the retaining pin, when the coupling is retracted, to retract said retaining pin, against the bias of said spring means, into said release position.

5. A coupling as claimed in claim 3 in which said lever has a finger portion engageable with the end of said retaining pin remote from the head portion thereof, when the coupling is retracted, to depress said pin, against the bias of said spring means into said release position.

6. A coupling as claimed in claim 1 in which the inner member of the coupling is formed with a neck portion intermediate the end portions thereof which are slidable within said outer member, said neck portion permitting said inner member to be universally movable transversely of the outer member to a limited angular extent when said coupling members are in their extended positions.

7. A coupling as claimed in claim 6 in which the inner end portion of the inner member and the interior of the outer member are of complementary non-circular shape.

References Cited

UNITED STATES PATENTS

| | | | |
|---|---|---|---|
| 2,691,932 | 10/1954 | Sawyer et al. | 280—510 X |
| 2,711,679 | 6/1955 | Kunary et al. | 280—510 X |
| 3,361,446 | 1/1968 | Jeffes | 280—478 |
| 3,384,937 | 5/1968 | Muncke et al. | 280—482 X |
| 3,329,445 | 7/1967 | Carson | 280—478 |

FOREIGN PATENTS 839,387 6/1960 Great Britain.

LEO FRIAGLIA, *Primary Examiner.*

U.S. Cl. X.R.

280—482, 504